March 16, 1937.   W. E. COAKLEY   2,073,684
METHOD OF MAKING BARRELS
Filed Sept. 23, 1933

INVENTOR.
William E. Coakley
BY
Bottum, Hudnall, Lecher,
McNamara and Michael
ATTORNEYS Patented Mar. 16, 1937

2,073,684

UNITED STATES PATENT OFFICE 2,073,684

METHOD OF MAKING BARRELS

William E. Coakley, Milwaukee, Wis., assignor to Pressed Steel Tank Company, West Allis, Wis., a corporation of Wisconsin Application September 23, 1933, Serial No. 690,658

3 Claims. (Cl. 113—120)

The present invention relates to metal barrels and to a method of making the same and is particularly concerned with the production of the metal barrel designed as a container for beer or other liquids.

One of the objects of the present invention is to provide a metal barrel which may be readily and economically produced from materials and by means of facilities ordinarily available and which, while of welded construction throughout, eliminates the so-called flash or sharp fragments of metal which usually are present along welded joints and must be ground away. It will be appreciated that the grinding operation represents an item of expense in the production of barrels and, furthermore, that it is extremely difficult to carry out in the final phases of constructing the barrel. With the present invention the welds produced present a smooth and finished surface and dispense with or substantially minimize grinding. Furthermore, the barrels produced are strong, rigid and well adapted to stand up under severe usage to which they are put.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1:
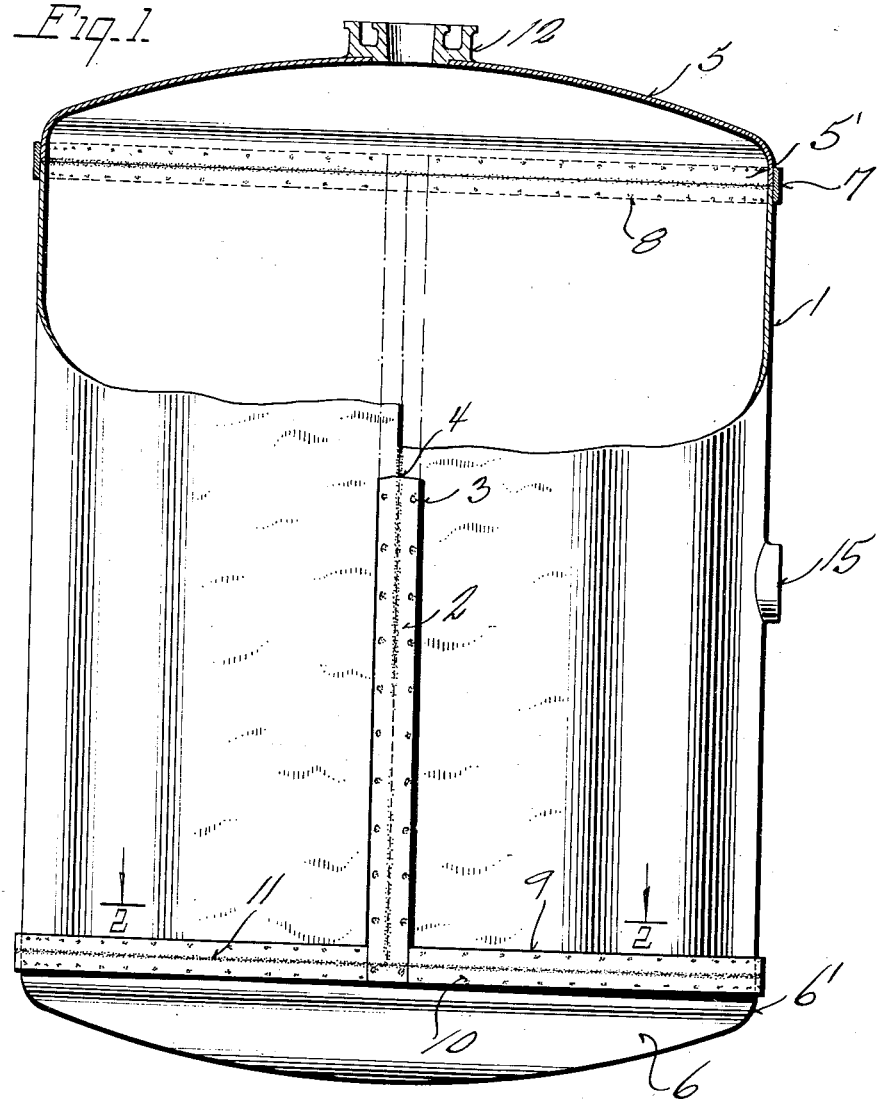
Figure 1 is a side elevation, partly broken away, showing a metal drum or barrel embodying the present invention.
Figure 2:
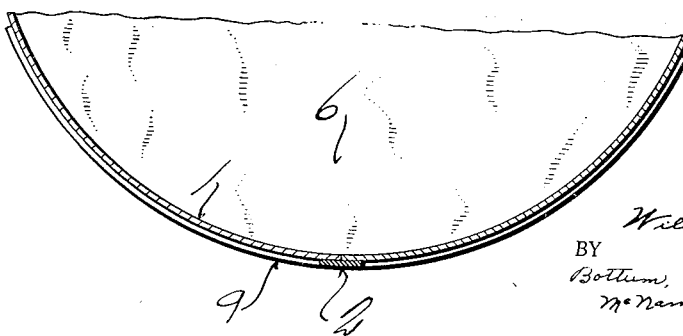
Figure 2 is a fragmentary view in horizontal cross section taken on line 2—2 of Figure 1.

Referring to the drawing, it will be seen that the metal barrel embodying the present invention has a body portion designated at 1 which is made up of a sheet rolled to cylindrical form and welded together at its meeting edges. In welding these meeting edges, a strip 2 is placed on the outside of the body portion in overlapping relation to the meeting edges and may be tack welded in place, as indicated at 3, if desired. Welding electrodes in the form of rolls which traverse the strip from end to end and also the meeting edges on the inside of the body portion are then employed to provide a continuous weld 4 between the meeting edges and the strip. The welding roll operating on the inside, straddles or overlaps the meeting edges of the barrel body, thus covering the edges being fused and preventing the formation of the so-called "flash".

The heads of the barrel designated at 5 and 6 are of dished or cupped formation, being stamped or drawn out from a metal plate in a suitable press. The head 5 is first assembled with the body portion. In effecting this assembly, the edge of the flanged portion 5' of the head 5 is first brought into abutting relation with the upper end of the body portion. A band 7 is then wrapped around the upper end of the body portion and the flange 5' of the head 5 and it is so dimensioned that its ends abut snugly against the side edges of the upper end of the strip 2. The band 7 may then be tack welded in place as indicated at 8 and the head 5, body portion 1 and band 7 are finally or completely welded by means of electrodes in the form of welding rolls, one operating on the outside of the strip 7 and the other operating across the seam or crevice between the upper end of the barrel and the flange 5' of the head 5, such other welding roll being introduced into the interior of the body portion through the lower open end thereof.

The head 6 is next welded to the lower end of the barrel body, its flange 6' being brought into abutting relation with the lower end and the crevice between the flange and the lower end being overlapped by an outside band 9 which may be first tack welded thereto, as indicated at 10, and finally welded thereto as indicated at 11, the final welding being effected by welding rolls traversing the band 9 on the outside and the abutting edges the lower end of the barrel body 1 and the flange 6' on the inside, the inside roll being introduced through the opening in the standard tap fitting 12 with which the head 5 is equipped. A suitable bung fitting 15 may be provided in the body of the barrel.

It is to be understood that the barrel or drum may be equipped with suitable chime structure should such be desired.

From the foregoing, it will be noted that an important feature of the invention resides in the elimination of the roughness or sharp fragments of metal, i. e., the so-called "flash" along the weld, and this is accomplished by the action of the rolling pressure of the electrodes over the meeting edges and on the strips or bands during the welding. The bands act during the welding operation to hold the edges being welded in proper relation and as they are fused to the edges they stiffen and strengthen the resulting structure.

It is to be understood that the barrel structure shown has been selected merely for the purposes of illustration or example and that various changes may be made in the size, shape and arrangement of the parts and also that variations may be resorted to in the practice of the method, all as will be obvious to those skilled in the art and all of which does not involve a departure from the spirit of the invention or from the scope of the subjoined claims.

The invention claimed is:

1. The herein described method of making barrels which consists in forming up a barrel body portion from a single sheet and into cylindrical form with the edges of the sheet abutting, overlapping said abutting edges with a strip, tack welding the strip to said edges, forming up from sheets of metal, dished barrel heads bringing the edges of the heads into abutting relation with the edges of the barrel body portion overlapping said last-named edges with metal bands and tack welding said last-named bands to said last-named edges, and then fusing said edges to said strip and said bands by welding rolls traversing the strip and bands on the outside of the barrel and traversing in a straddle fashion said abutting edges on the inside of said barrel, whereby precluding the formation of welding flash on the inside of said barrel.

2. The herein described method of making barrels, which consists in forming barrel sections corresponding to the body portion and heads of the barrel, bringing the edges of said sections into abutting relation, overlapping the abutting edges of said sections with metal strips on the outside of the barrel, tack welding said strips to said edges and then fusing said edges to said strips by welding rolls traversing the strips on the outside of the barrel and traversing the abutting edges in overlapping fashion on the inside of said barrel whereby said edges are covered during fusion to prevent formation of welding flash on the inside of said barrel.

3. The herein described method of making barrels, which consists in forming up barrel sections corresponding to the body portion and heads of the barrel, bringing the edges of said sections into abutting relation to form a barrel having an opening therein, placing strips on the outer side of said barrel in overlapping relation to said abutting edges and then fusing said edges to said strips by welding rolls traversing said strip on the outside of said barrel and by welding rolls traversing said abutting edges in straddle fashion on the inside of each barrel, said latter mentioned welding rolls being introduced into said barrel through said opening.

WILLIAM E. COAKLEY.